United States Patent [19]
Horie et al.

[11] Patent Number: 6,146,789
[45] Date of Patent: Nov. 14, 2000

[54] BATTERY HAVING A VISIBLE-LIGHT OR NEAR-INFRARED-LIGHT CURING RESIN AS AN INSULATING SEAL

[75] Inventors: Kenichi Horie; Katsuhiko Kishi, both of Hachioji; Teiji Okayama; Mutsuhiro Maeda, both of Tokyo, all of Japan

[73] Assignee: Three Bond Co., Ltd., Tokyo, Japan

[21] Appl. No.: 09/102,914

[22] Filed: Feb. 16, 2000

Related U.S. Application Data

[62] Division of application No. 08/700,768, Aug. 15, 1996, abandoned.

[51] Int. Cl.$^7$ .............................. C08F 2/50; H01M 2/08; H01M 2/14
[52] U.S. Cl. .................. 429/185; 429/129; 429/131; 429/163; 522/24; 522/26; 522/28; 522/7; 522/96; 29/623.1; 29/623.4; 156/272.8; 156/275.5; 156/275.7
[58] Field of Search .................................. 522/24, 26, 28, 522/96, 7; 429/185; 29/623.1, 623.4; 156/272.8, 275.5, 275.7

[56] References Cited

U.S. PATENT DOCUMENTS

| | | |
|---|---|---|
| 3,713,896 | 1/1973 | Feldhake . |
| 4,265,723 | 5/1981 | Hesse et al. . |
| 4,950,581 | 8/1990 | Koike et al. . |
| 4,954,414 | 9/1990 | Adair et al. . |
| 4,971,891 | 11/1990 | Kawamura et al. . |
| 5,055,372 | 10/1991 | Shanklin et al. . |
| 5,254,602 | 10/1993 | Tomura et al. . |
| 5,385,807 | 1/1995 | Okamoto et al. . |
| 5,646,198 | 7/1997 | Tanaka et al. . |
| 6,011,180 | 1/2000 | Cunningham et al. . |

FOREIGN PATENT DOCUMENTS

| | | |
|---|---|---|
| 56-165264 | 12/1981 | Japan . |
| 1107449 | 10/1987 | Japan . |
| 2177252 | 12/1988 | Japan . |
| 5-63901 | 4/1992 | Japan . |
| 4-118855 | 9/1993 | Japan . |
| WO95/29513 | 11/1995 | WIPO . |

*Primary Examiner*—Susan W. Berman
*Attorney, Agent, or Firm*—Lowe Hauptman Gopstein Gilman & Berner

[57] ABSTRACT

In a battery in which a metallic battery case for accommodating electricity-generating elements also serves as an electrode, a visible-light or near-infrared-light curing resin is used for providing a coating to insulate an end face and a peripheral edge portion of an opening portion of the battery case or a gap between a positive electrode and a negative electrode. The visible-light or near-infrared-light curing resin excels in a depth-curing characteristic as compared with a conventional ultraviolet curing resin, and cures well even up to a portion such as an insulating seal of a battery where a light-receiving port is light and the light is difficult to reach. Hence, the visible-light or near-infrared-light curing resin is prevented from becoming peeled off and provides a reliable insulting characteristic.

15 Claims, 2 Drawing Sheets

BATTERY HAVING A VISIBLE-LIGHT OR NEAR-INFRARED-LIGHT CURING RESIN AS AN INSULATING SEAL

This application is a division of application Ser. No. 08/700,768 filed Aug. 15, 1996, now abandoned.

BACKGROUND OF THE INVENTION

1. Field of the Invention

The present invention relates to an insulating sealing resin for an alkaline battery, and more particularly to a sealing resin which cures an application of visible light rays or near infrared rays thereto.

2. Description of the Related Art

In a dry battery, electricity-generating elements are accommodated in a metallic battery case, which also services as an electrode, and a metal cap which is a counter electrode. For example, as shown in FIG. 1, an alkaline battery has a metallic battery case 11 which also serves as a positive electrode terminal, and a positive electrode combining agent is filled therein. A gel-like zinc negative electrode and a negative current collector are disposed further inside the metallic battery case 11 by being separated by a separator. The negative current collector is connected to a negative electrode terminal 12. Further, the negative electrode terminal 12 is secured by a calked portion 11' of the battery case 11 with a gasket 13 placed therebetween. As can be seen from FIG. 1, the calked portion 11' of the positive electrode and the negative electrode 12 are disposed in very close proximity to each other, and if these two electrodes come into contact with each other, an external short-circuiting naturally occurs, resulting in the breakage of the electrodes and leakage of the solution.

Unless this portion is insulated and protected, not only is a coil spring-like terminal on the appliance side liable to enter between a negative electrode bottom plate and a calked portion of the positive electrode battery case at the time of fitting and using the battery, but also a short-circuiting can occur if the battery is placed upright on a metal portion with the negative electrode bottom plate placed downward during storage.

For this reason, coating and insulation are conventionally provided only by an insulating heat-shrunk sheet 15, or an insulating characteristic is secured by fitting an insulating circular or cylindrical cap (see Japanese patent Application Laid-Open No. 118855/1992). Further, there is an example in which an ultraviolet curing resin is used as an insulating and coating material (see Japanese Patent Application Publication No. 63901/1993).

If insulation is provided by coating only by the heat-shrunk sheet, there are cases where the sheet is peeled off the bottom portion of the battery due to the deterioration of an adhesive or friction during transport or storage of the battery, and the battery is liable to be subjected to damage such as the peeling off or fracture of a label by the appliance-side terminal during the fitting or detaching of the battery with respect to the appliance for which the battery is used, so that the two electrodes are liable to be exposed. Hence the battery using such an insulation lacks reliability in the insulating characteristic.

On the other hand, if the insulating circular or cylindrical cap is fitted, the reliability of insulation becomes high. However, insulating cape are products which are formed by being blanked out from an insulating sheet or by using a die assembly, and these caps are fabricated in conformity to the shapes of batteries. Since there are many shapes of batteries, it is necessary to prepare insulating caps in conformity to the shapes of the batteries, so that the inventory control of parts is troublesome. In addition, the number of steps of fitting the cape increases, so that the cost becomes high.

The method of securing the insulating characteristic by means of an ultraviolet curing resin is seen in Japanese Patent Application Laid-Open No. 63901/1993. The ultraviolet curing resin does not require the mixing of two components or heating, and can be cured in several seconds upon application of light thereto, so that the ultraviolet curing resin is an advantageous material.

However, the ultraviolet radiation is electromagnetic radiation which is harmful to the human body, and generates ozone gas, so that an ultraviolet-emitting lamp device provided with a local exhauster is required. The lamp for emitting the ultraviolet radiation is expensive.

In addition, if the ultraviolet curing resin is used as a battery insulating seal, there is a serious problem. The ultraviolet curing resin is composed of a mixture of a substance for polymerizing a radical, such as an acryl radical, and an ultraviolet initiator. The ultraviolet initiator is activated upon application of ultraviolet radiation thereto and produces a radical. That is, there is a problem in that a portion which is shaded and to which ultraviolet radiation is not applied and a thick coating portion which the ultraviolet radiation does not reach do not cure.

In a case where only the surface of the ultraviolet curing resin is cured and its interior is not cured, the resin is easily peeled off by vibrations or a stress from the outside. Further, in the interior is uncured in the case of a battery seal, the uncured resin is dispersed in and penetrates the interior of the battery, and is mixed and reacts with the electricity-generating elements, thereby undermining the performance of the battery. Therefore, such a case is not desirable.

SUMMARY OF THE INVENTION

Accordingly, it is an object of the present invention to provide a visible-light or near-infrared-light curing resin composition which is capable of overcoming the above-described drawbacks of the conventional art.

To this end, in accordance with one aspect of the present invention, there is provided a visible-light or near-infrared-light curing resin composition for use in a battery in which a metallic battery case for accommodating electricity-generating elements also serves as an electrode terminal, wherein a visible-light or near-infrared-light curing resin is used for providing a coating to insulate an end face and a peripheral edge portion of an opening portion of the battery case or a gap between a positive electrode and a negative electrode, the resin composition essentially consists of: a) a compound having in its molecule at least one ethylenic unsaturated radical which is radial polymerizable; and b) a light curing catalyst having an absorbing band in a visible-light or near-infrared-light wavelength region and for producing a radial on application of visible light or near-infrared light thereto.

In accordance with another aspect of the present invention, the light curing catalyst which is the b) component is selected from the group consisting of: 1) a combination of a boron compound, a cationic dye, and an azo compound, 2) a combination of a boron compound, a cationic dye, and an organic peroxide, 3) a combination of camphor quinone and an organic peroxide, 4) a combination of camphor chinone and an azo compound, 5) a combination of an acyl phosphine oxide and an organic peroxide, and 6) a combination of an acyl phosphine oxide and an azo compound.

Here a detailed description will be given of the visible-light or near-infrared-light curing resin. The compound having in its molecule at least one ethylenic unsaturated radical which is radial polymerizable, which is the component a) of this composition, undergoes polymerization reaction and is cured by being combined with a polymerization catalyst for generating a free radical, upon application of light thereto. Among the polymerizable ethylenic unsaturated compounds, compounds having in their molecules at least one (meta)acryloyl radical are included, and it is possible to cite polymers having in their molecules at least two (meta)acryloyl radicals, such as urethane di(meta) acrylate, epoxy di(meta) acrylate, and polyester di(meta) acrylate, as well as monomers having in their molecules at least one (meta)acryloyl radical, such as 2-hydroxyethyl (meta)acrylate, diethylene glycol (meta) acrylate, and phenoxyethyl (meta)acrylate. These polymers and monomers may be used singly or in combination. Further, as another polymerizable ethylenic unsaturated compound, it is possible to cite a resin which unfailingly includes as a component an unsaturated acid, such as maleic anhydride or fumaric acid, jointly uses a saturated polybasic acid, such as phthalic anhydride or isophthalic acid, and is obtained by being esterified with a polyhydroxy alcohol, such as propylene glycol or ethylene glycol, is dissolved in a polymerizing monomer having its molecule a reactive ethylenic unsaturated bond.

The light curing catalyst which is the b) component of the present invention is selected from the group consisting of: 1) a combination of a boron compound, a cationic dye, and an azo compound, 2) a combination of a boron compound, a cationic dye, and an organic peroxide, 3) a combination of camphor chinone and an organic peroxide, 4) a combination of camphor chinone and an azo compound, 5) a combination of an acyl phosphine oxide and an organic peroxide, and 6) a combination of an acyl phosphine oxide and an azo compound.

The boron compound and the cationic dye can be expressed by a mixture in accordance with the following Formulae (1) to (3):

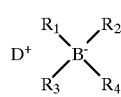

(Formula 1)

(Formula 2)

 

(Formula 3)

In Formula (1), $D^+$ is a cationic dye having an absorbing band in a visible-light to near-infrared-light wavelength region, and $R_1$, $R_2$, $R_3$, and $R_4$ respectively independently denote alkyl, aryl, alkaryl, allyl, aralkyl, alkenyl, alkynyl, and an alicyclic or saturated or unsaturated heterocyclic radical, at least one of $R_1$, $R_2$, $R_3$, and $R_4$ being an alkyl radical having a carbon atom number of 1 to 8.

In Formula (2), $D^+$ is the same as described above, and $A^-$ denotes an anion.

In Formula (3), $R_1$, $R_2$, $R_3$, and $R_4$ are the same as described above, and $R_5$, $R_6$, $R_7$, and $R_8$ respectively independently denote a hydrogen atom, alkyl, aryl, alkaryl, allyl, aralkyl, alkenyl, alkynyl, and an alicyclic or saturated or unsaturated heterocyclic radical.

The cationic dye according to Formulae (1) and (2), which is combined with the boron compound, is not particularly limited insofar as it has an absorbing band in a visible-light to near-infrared-light wavelength region. Preferably, it is possible to cite cyanine, merocyanine carbocyanine, rhodamine, azo methine, indoaniline, azulene, polymethine, triaryl methane, indoline, thiazine, xanthene, acridine, axadine, aminium, and diimonium dyes.

Preferable examples of a boron anion according to Formulae (1) and (3) are a triphenylbutyl borate anion and a trianisyl-butyl borate anion. These are easily dissolved and become triphenyl borane or trianisyl borane and butyl radical. These anions form complexes with the aforementioned cationic dye.

As the anion according to Formula (2), it is possible to cite a halogen anion, $ClO_4^-$, $PF_6^-$, $BF_4^-$, $SbF_6^-$, $CH_3SO_3^-$, $F_3CSO_3^-$, $C_6H_4SO_3^-$, $CH_3C_6H_4SO_3^-$, $HOC_6H_4SO_3^-$, and $ClC_6H_4SO_3^-$.

Here the azo compound is a compound which is expressed by the general formula:

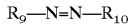

(where $R_9$ and $R_{10}$ are substituted or nonsubstituted aklyl radical or alkenyl radicals of the same or different type). Specifically, such compounds include 2,2'-azo-isobutyronitrile, 4,4'-azobis(4-cyano valerianic acid), 2,2'-azobis(2,4-dimethyl valeronitrile), 1,1'-azobis-cyclohaxane-1-carbonitrile), 2,2'-azobis-iso-dimethyl butyrate, 2,2'-azobis(2-methyl propionate), 2,2'-axobis(2-cyclobutyl propionate), 2,2'-azobis(2-cyclobutyl propionate), 2,2'-azobis[2-(3-hydroxy phenyl) butyrate], 2,2'-azobis(4-nitro valerianic acid), and 2,2'-azobis(4-chloro valerianic acid).

As the organic peroxide, a known one is used. Typical organic peroxides include diacyl peroxides, dialkyl peroxides, ketone peroxides, peroxy esters, and the like Particularly useful among them are organic peroxides for which the temperature for obtaining a half life in 10 hours is 50° C. or more, preferably 70 to 110° C. Specifically, such organic peroxides include t-butyl peroxy(2-ethylhexanoate), m-toluoyl peroxide, benzoyl peroxide, t-butyl peroxy isoburyate, cyclohexanoate peroxide, t-butyl peroxide isobutyl isopropyl carbonate, t-butyl peroxy acetate, t-butyl peroxy benzoate, dibutyl peroxy isophthalate, benzoyl peroxide, dicumyl peroxide, and the like.

As specific examples of acyl phosphine oxides, it is possible to cite 2,4,6-trimethyl benzoyl diphenyl phosphine oxide, 2,4,6-triethyl benzoyl diphenyl phosphine oxide, and 2,4,6-triphenyl benzoyl diphenyl phosphine oxide, and the like.

Such a catalyst having an absorbing band in a visible-light or near-infrared-light wavelength region may be used in an amount of 0.1 to 5.0 parts by weight, preferably 0.3 to 1.5 parts by weight with respect to 100 parts by weight of the aforementioned ethylenic unsaturated compound. If the amount is excessively small, the curing properties deteriorate, and if it is excessively large, the deterioration of the cured substance is speeded.

The light for curing the visible-light or near-infrared-light curing resin may be either visible light or near infrared light. Although the near infrared light exhibits a good curing characteristic since it radiates heat, and the curing time is shorter than the visible light, but the battery is subjected to excess heating. Since heating is not very suitable to the battery, it is possible to selectively use the visible light and the near infrared light as required.

In addition, as a light source for radiating the visible light or the near infrared light, it is possible to cite a xenon lamp, a metal halide lamp, and a halogen lamp. In a longer wavelength region, near infrared ray, infrared ray, far infrared ray lamps and the like are suitable. Further, the sun rays are also suitable. Among them, as a light source which efficiently radiates the visible light and infrared light, a halogen lamp and an infrared ray lamp are particularly suitable.

In addition, various additives may be added to the visible-light or near-infrared-light curing resin to improve the physical and other properties. For instance, inorganic fillers, such as silica, talc, quarts, and calcium carbonate, a polymerization inhibitor, and adhesion-improving agent, an antioxidant, and antifoamer, and the like may be added.

Since an insulating seal is provided by the visible-light or near-infrared-light curing resin, the insulation between the two electrodes in the vicinity of an opening portion of a metallic battery case can be made reliable, and even if the heat-shrunk film is peeled off or damaged, an external shortcircuiting does not occur. In addition, since a liquid resin is applied in conformity to the shape of the battery, and is allowed to cure by the visible light or near infrared light, even if the battery shapes are diverse, it is unnecessary to prepare parts for the respective shapes, and since it cures speedily, the visible-light or near-infrared-light curing resin in accordance with the present invention, when used in production lines, excels in mass productivity and is therefore advantageous.

Furthermore, unlike the ultraviolet curing resin, the visible-light or near-infrared-light curing resin in accordance with the present invention is capable of curing with a large thickness, and since even in the case where the light receiving portion is narrow and is difficult to receive the light, the visible-light or near-infrared-light curing resin in accordance with the present invention is capable of curing. Therefore, the visible-light or near-infrared-light curing resin can be used not only as insulating seals for the two electrodes but can also be substituted for a solid gasket for preventing leakage of electricity-generating elements in the battery. For this reason, it is possible to make the thickness of the solid gasket thin. Alternatively, the solid gasket may not be used, and the amount of contents of the electricity-generating elements can be increased.

The above and other objects, features and advantages of the present invention will become more apparent from the following detailed description of the invention when read in conjunction with the accompanying drawings.

DESCRIPTION OF THE PREFERRED EMBODIMENT

Referring now to the accompanying drawings, a description will be given of an embodiment of the present invention. It should be noted, however, that the present invention is not limited to the following embodiment which is given only for illustrative purposes only

EXAMPLE 1

PREPARATION OF RESIN

A light curing resin was prepared on the basis of the composition shown in Table 1 below. It should be noted that, as urethane diacrylate, one was used in which tolylene diisocyanate and polypropylene glycol were reacted at a molar ratio of 2:1, and the mixture was then reacted with 1 mol of hydroxy acrylate. In this way, resins A, B, and C were obtained. In addition, an ultraviolet curing resin D was obtained for the purpose of comparison.

TABLE 1

|  | A | B | C | D |
| --- | --- | --- | --- | --- |
| urethane diacrylate | 40 | 40 | 40 | 40 |
| isoboronyl acrylate | 60 | 60 | 60 | 60 |
| tetramethyl ammonium n-butyl triphenyl boron | 1.0 |  |  |  |
| camphor quinone |  | 1.0 |  |  |
| 2,4,6-trimethyl benzoyl diphenyl phosphine oxide |  |  | 1.0 |  |
| 1-hydroxy cyclohexyl phenyl ketone |  |  |  | 1.5 |
| azobisisobutyronitrile | 0.5 |  | 0.5 |  |
| benzoyl peroxide |  | 0.5 |  |  |

EXAMPLE 2

Figure 1:
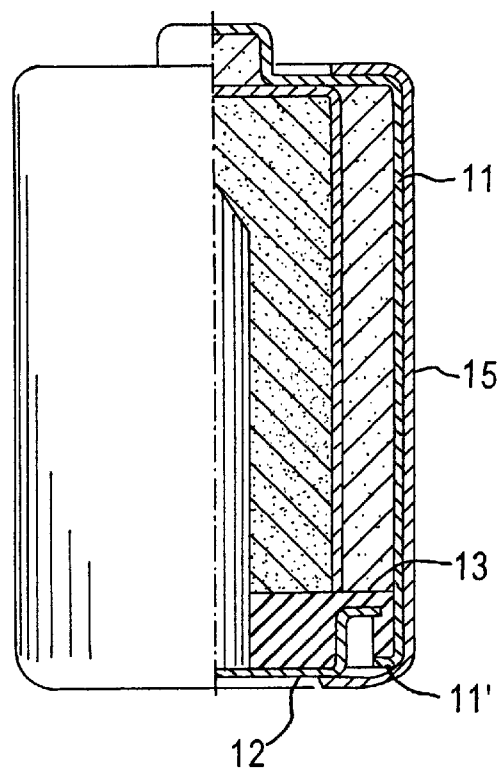
FIG. 1 is a half cross-sectional view illustrating a conventional alkaline battery which is insulated by a heat-shrunk sheet.
Figure 2:
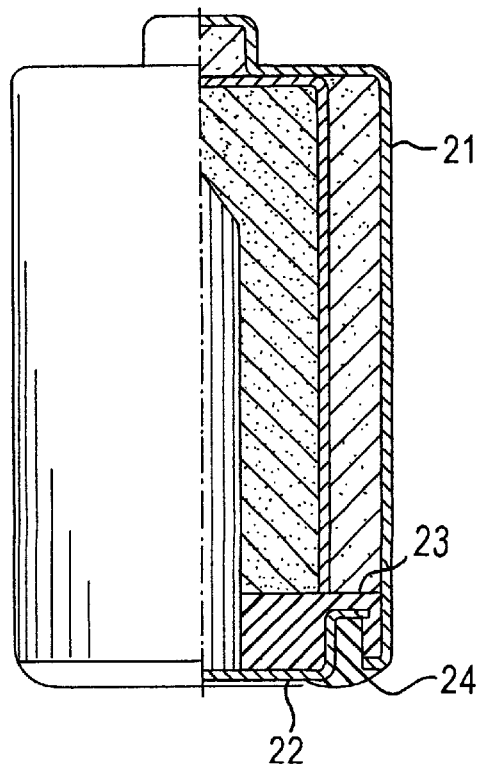
FIG. 2 is a half cross-sectional view in accordance with Example 2 of an alkaline battery in accordance with the present invention.

The resin a obtained in Example 1 was used as an insulating sealant for an alkaline battery. Its example is is shown in FIG. 2. In the drawing, reference numeral 21 denotes a metallic battery case which also served as a positive electrode terminal, and a positive electrode combining agent, a bag-like separator, and a gel-like zinc negative electrode were filled therein. Reference numeral 22 denotes a negative electrode terminal which was welded to a negative electrode collector. A gasket 23 was fitted to the negative electrode terminal 22, and was secured by a lower peripheral edge of the battery case 21 which was calked. The calked portion held the gasket sufficiently. The resin A was applied to a gap portion between the calked portion and the negative electrode terminal 22, and visible light rays were applied to the resin A, thereby obtaining an insulating coat 24.

EXAMPLE 3

Figure 3:
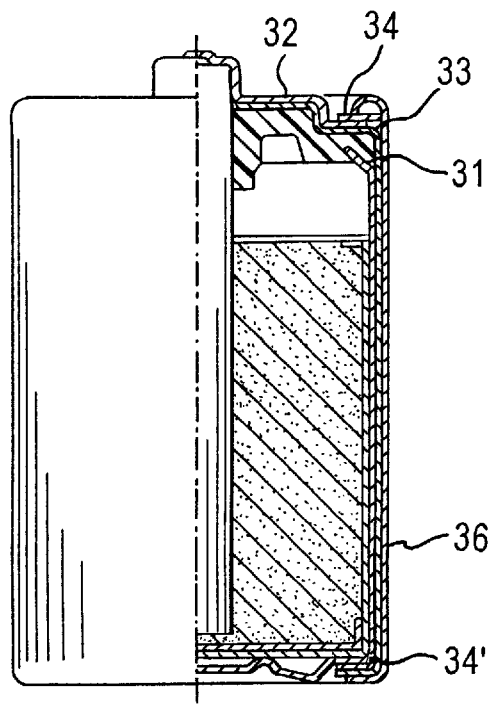
FIG. 3 is a half-cross-sectional view in accordance with Example 3 of a manganese battery in accordance with the present invention.

The resin B obtained in Example 1 was used as an insulating sealant for a manganese battery. Its example is is shown in FIG. 3. In the drawing, reference number 31 denotes a metallic battery case which also served as a negative electrode terminal, and a positive electrode combining agent, an electrolyte, an upper cover sheet, and a carbon rod were filled therein. An opening of this case was sealed by a sealing member 33 made of a synthetic resin and having in its center a through hole through which the carbon rod was passed, an outer periphery of the battery case 31 was coated with a heat-shrinkable tape, and an upper end of the battery case 31 extended into an upper portion of the sealing member 33. A positive electrode terminal 32 was fitted to the head of a carbon rod, and an outer peripheral edge portion of the positive electrode terminal plate 32 was coated with the resin B, which was irradiated with visible light rays, thereby obtaining an insulating coat 34. In addition, an outer peripheral edge portion of the negative electrode terminal plate was also coated with the resin B, which was similarly irradiated with visible light rays, thereby obtaining an insulating coat 34'. Subsequently, an opening portion of a metal outer can 36 was bent inwardly to tighten the positive electrode terminal in the downward direction of the battery with the insulating coat 34 placed therebetween, so as to hold the positive electrode terminal and the contents.

EXAMPLE 4

Figure 4:
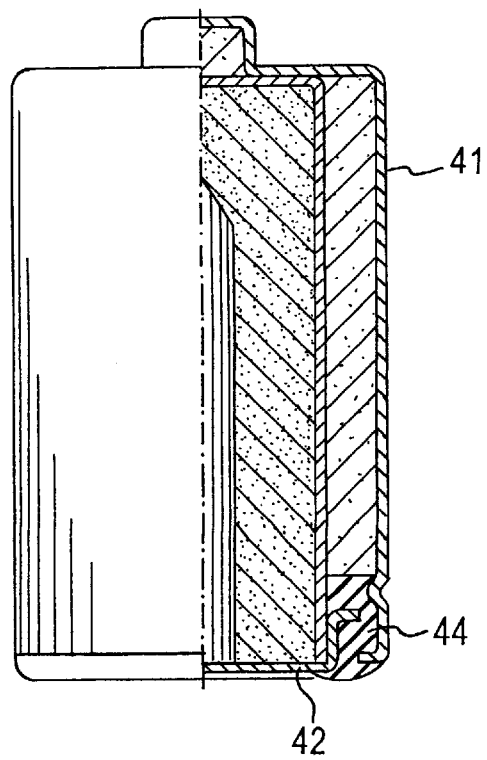
FIG. 4 is a half cross-sectional view in accordance with Example 4 of an alkaline battery in accordance with the present invention.

The resin C obtained in Example 1 was used as an insulating sealant and a sealant for fixing a negative electrode terminal in an alkaline battery. Its example is shown in FIG. 4. In the drawing, reference number 41 denotes a metal can in which the same contents as those of Example 2 are filled. A negative electrode terminal 42, to which a negative electrode current collector was welded, was not fitted with a solid gasket, was inserted into the interior of the battery, and the resin C was applied to an opening portion as at 44 and was allowed to cure on application of visible light rays thereto. The resin c cured uniformly up to its interior and reliably secured the negative electrode terminal plate 42 and the battery case 41. Further, the coated portion of the two electrodes were completely coated, and the coating resin was not peeled off.

COMPARATIVE EXAMPLE 1

The resin D, which was an ultraviolet curing resin, was applied to the same portion as that in Example 2, and ultraviolet rays were applied thereto. Although the surface of the resin D cured, its interior was not cured, and the coating resin was easily peeled off.

COMPARATIVE EXAMPLE 2

The resin D, which was an ultraviolet curing resin, was applied to the same portion as that in Example 4, and ultraviolet rays were applied thereto. Although the surface of the resin D cured, but its interior remained uncured, and the negative electrode plate was not fixed. Further, the coating resin was easily peeled off.

From these facts, it can be appreciated that the ultraviolet curing resin has poor interior curing properties, and since particularly the opening portion of the battery is narrow and is not sufficiently wide as a port for receiving the light, the ultraviolet curing resin does not cure up to its interior. In contrast, the visible-light or near-infrared-light curing resin has high sensitivity to visible light or near infrared rays, and has excellent light transmittance, so that the visible-light or near-infrared-light curing resin is cured even up to its interior even in the case of a portion such as a battery seal which is disadvantageous to light curing As described above, since the visible-light or near-infrared-light curing resin is used as an insulating sealant for a battery, as compared with the case where a cap is fitted, production cost is low and productivity excels, and as compared with he case where an ultraviolet curing resin is used, it is possible to allow the resin to cure safely by inexpensive visible light without using harmful ultraviolet rays. In addition, even in the case where the coat is thick and the light receiving portion is narrow, it is possible to allow the resin to be reliably cured up to its interior, so that the reliability of insulation can be enhanced.

Since the adhesion between the metal and the resin is excellent, and the resin can e cured up to its interior, the visible-light or near-infrared-light curing resin can be used not only as insulting seals for the positive electrode terminal and negative electrode terminal but can be substituted for a solid gasket for preventing leakage of electricity-generating elements in the battery. For this reason, it is possible to make the thickness of the solid gasket thin. Consequently, it is possible to increase the amount of contents of the electricity-generating elements in the battery and obtain higher performance.

What is claimed is:

1. A battery comprising a battery case comprising an end face and a peripheral surface having an edge proximate to said end face defining a gap between said end face and said peripheral portion; a visible-light or near-infrared-light cured resin substantially filing said gap; a positive electrode; and a negative electrode; wherein both electrodes are operatively mounted within the case;

wherein said resin composition comprises:
  a) a compound comprising at least one free radical polymerizable, ethylenic unsaturated, group; and
  b) a light curing catalyst having an absorption band in a visible-light or near-infrared-light wavelength region, which catalyst is selected to produce a radical on exposure to said visible light or near-infrared light, wherein said catalyst comprises at least one member selected from the group consisting of:
  1) a combination of a boron compound, a cationic dye, and an azo compound;
  2) a combination of a boron compound, a cationic dye, and an organic peroxide;
  3) a combination of a camphor quinone and an azo compound;
  4) a combination of a camphor quinone and an organic peroxide;
  5) a combination of a acyl phosphine oxide and an organic peroxide; and
  6) a combination of a acyl phosphine oxide and an azo compound.

2. A battery as claimed in claim 1 wherein said end face comprises said negative electrode terminal and said peripheral surface comprises said positive electrode terminal.

3. A battery as claimed in claim 2 wherein said end face comprises said negative terminal and said peripheral portion comprises said positive terminal.

4. A battery as claimed in claim 1 further comprising an alkaline electrolyte.

5. A battery as claimed in claim 4 further comprising a gasket between said end face and said electrolyte, wherein said end face is inwardly directed toward said electrolyte, wherein a portion of said peripheral surface, proximate to said end face, is inwardly directed toward said end face and is operatively associated with said gasket whereby maintaining said gasket in a substantially fixed position relative to said end face and said electrolyte, and wherein said resin is disposed between said inwardly directed portion of said end face and said inwardly directed portion of said peripheral surface in a sealing engagement with both said end face and said peripheral portion.

6. A battery as claimed in claim 4 further comprising a rod comprising carbon disposed within said electrolyte in longitudinal relationship to said peripheral portion of said battery; a polymeric sealing member substantially surrounding said rod and operatively contacting said peripheral portion; a positive electrode cap operative associated with said rod and disposed on said polymeric sealing member at an end of said battery opposite to said end face; said peripheral portion being inwardly bent proximate to said end face and proximate to said positive electrode; and said resin being disposed between said inwardly bent peripheral portions and said positive electrode and said end plate, respectively.

7. A battery as claimed in claim 1 wherein said negative electrode comprises zinc.

8. A battery as claimed in claim 1 wherein said negative electrode comprises manganese.

9. A battery as claimed in claim 1 wherein said resin comprises a polymerization product of at least one compound containing at least one meth acryloyl radical.

10. A battery as claimed in claim 9 wherein said compound is at least one member selected from the group consisting of: urethane di (meth) acrylate; epoxy di (meth) acrylate; polyester di (meta) acrylate; 2-hydroxyethyl (meth) acrylate; diethylene glycol (meth) acrylate; and phenoxy ethyl (meth) acrylate.

11. A battery as claimed in claim 3 wherein said resin composition comprises a polyester product of at least one compound selected from the group consisting of maleic anhydride; fumaric acid; phthalic anhydride; and isophthalic acid.

12. A battery as claimed in claim 11 wherein said polyester comprises at least one esterifying alcohol selected form the group consisting of: propylene glycol and ethylene glycol.

13. A battery as claimed in claim 1 wherein said cationic dye is at least one member selected from the group consisting of: cyanine, mero cyanine, carbo cyanine, rhodamine, azo methine, indoanaline, azulene, polymethine, triaryl methane, indoline, thiazine, xanthine, acridine, axidine, aminium, and diammonium dyes.

14. A battery as claimed in claim 1 wherein said boron compound is at least one anion selected from the group consisting of: compounds having at least one triphenyl butyl borate anion, and trianisyl butyl borate anion.

15. A battery comprising a battery case comprising an end face and a peripheral surface having an edge proximate to said end face defining a first between said end face and said peripheral portion; a positive electrode; a negative electrode; wherein both electrodes are operatively mounted within the case and have a first therebetween; and a visible-light or near-infrared-light curing resin substantially filing said first wherein said resin composition comprises:

a) a compound comprising at least one free radical polymerizable, ethylenic unsaturated, group; and b) a light curing catalyst having an absorption band in a visible-light or near-infrared-light wavelength region, which catalyst is selected to produce a radical on exposure to said visible light or near-infrared light, wherein said catalyst comprises at least one member selected from the group consisting of:

1) a combination of a boron compound, a cationic dye, and an azo compound;

2) a combination of a boron compound, a cationic dye, and an organic peroxide;

3) a combination of a camphor quinone and an azo compound;

4) a combination of a camphor quinone and an organic peroxide;

5) a combination of an acyl phosphine oxide and an organic peroxide; and 6) a combination of an acyl phosphine oxide and an azo compound.

* * * * *